Mar. 27, 1923.
C. E. GRAVES.
FLASH LIGHT HOLDER FOR BICYCLES.
FILED AUG. 11, 1921.
1,449,509.
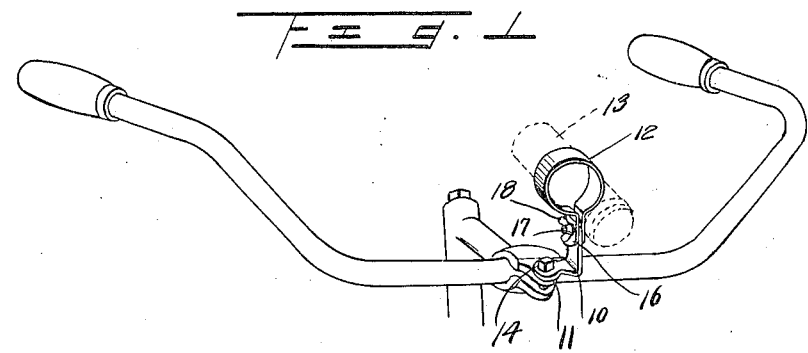
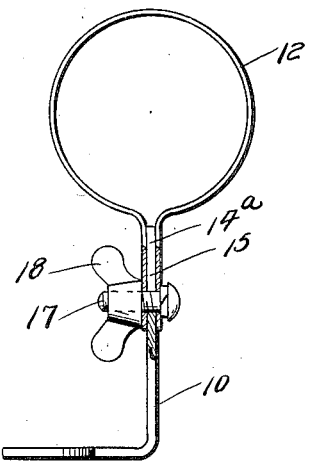
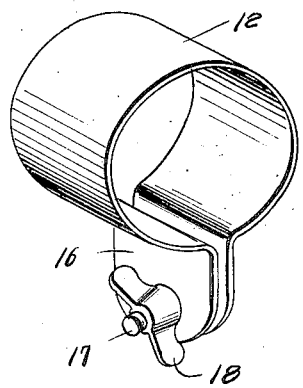
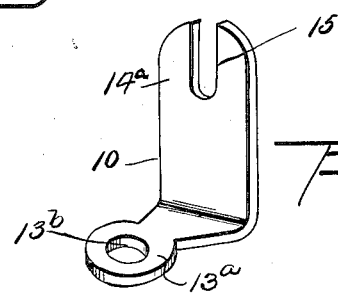
Inventor
C. E. Graves.
Attorney Patented Mar. 27, 1923.

1,449,509

UNITED STATES PATENT OFFICE.

CLARENCE E. GRAVES, OF HAMMOND, INDIANA.

FLASH-LIGHT HOLDER FOR BICYCLES.

Application filed August 11, 1921. Serial No. 491,497.

*To all whom it may concern:*

Be it known that I, CLARENCE E. GRAVES, a citizen of the United States, residing at Hammond, in the county of Lake and State of Indiana, have invented certain new and useful Improvements in a Flash-Light Holder for Bicycles; and I do hereby declare the following to be a full, clear, and exact description of the invention, such as will enable others skilled in the art to which it appertains to make and use the same.

The object of the invention is to provide a simple and efficient means for carrying a flash light on a bicycle under such conditions as to permit of directing the light or rays as may be required for the guidance and information of the rider and also permit of ready removal of the flash light from the vehicle when it is desired to leave the same so that the surreptitious removal and appropriation of the flash light may be prevented; and to this end the invention consists in a construction and relation of parts of which a preferred embodiment is illustrated in the accompanying drawing, wherein:

Figure 1 is a view of a device embodying the invention applied in the operative position to the handle bar of a bicycle, a flash light being shown operatively secured therein.

Figure 2 is a detail in elevation and partly in section enlarged of a holder embodying the invention.

Figures 3 and 4 are detail views in perspective of the members of the holder detached and disconnected.

The holder consists essentially of a support 10 adapted to be secured to the handle bar of the vehicle as indicated at 11, and a clamp 12 which is adapted to encircle and engage the flash light tube or casing 13 for engagement with the support 10 to support the flash light within convenient reach of the hand of the rider of the vehicle.

While obviously various forms of means may be employed for securing the support to the handle bar, it is preferred to provide the same with an ear 13$^a$ having an opening 13$^b$ adapted to be fitted over one of the bolts 14 serving to connect the handle bar with the head of the bicycle, it being obvious that one of the nuts may readily be removed to permit of the application of the support which will then be securely held in position although adapted if desired to turn to vary the angular position of the flash light which is supported thereon.

The support further includes an upright or upstanding ear 14$^a$ in which is arranged a slot 15, and the ends of the clamp 12 which is adapted to embrace the flash light are provided with terminal ears 16 connected by a bolt 17 having a thumb nut 18. The clamp being engaged with the flash light it is obvious that the ears 16 may be slipped downwardly upon either side of the plane of the ear 14$^a$ of the support so that the bolt 17 passes into the slot 15 of the support whereupon a tightening of the thumb nut 18 will lock the clamp to the support and hence secure the flash light against accidental displacement or loss due to the vibration of the machine. On the other hand when it is desired to leave the machine the loosening of the thumb nut will permit of the removal of the clamp from the support to which it may be returned when the rider desires to resume his journey.

Having thus described the invention, what I claim is:—

A flash light holder for bicycles comprising a support for attachment to a bicycle, said support having an upstanding portion provided with a vertical slot opening through the upper edge thereof; and a clamp consisting of a metallic band adapted to encircle a flashlight casing, said band having its terminals bent to provide a pair of parallel outwardly extending perforated ears, a bolt passing through the perforations in said ears, a wing nut threaded on said bolt, said ears adapted to be disposed one on each side of said upstanding portion of the support, said bolt adapted to be disposed in said slot, and said wing nut adapted to draw said bolt to cause said band to tightly engage the flash light casing and to bind said ears to said support, whereby said flash light is clamped in the band and the band is detachably secured to the support.

In testimony whereof I affix my signature in presence of two witnesses.

CLARENCE E. GRAVES.

Witnesses:
 WALTER E. MEYER,
 ARTHUR J. WEISS.